United States Patent [19]

Wright et al.

[11] 4,380,611
[45] Apr. 19, 1983

[54] ETHERIFIED METHYLOL POLYAMIDE CROSSLINKING AGENT, PROCESS FOR PRODUCING THE SAME AND RESINS CROSSLINKED THEREWITH

[75] Inventors: Howard J. Wright, Kansas City, Mo.; Joseph H. Scherrer, Shawnee Mission, Kans.

[73] Assignee: Cook Paint and Varnish Company, Kansas City, Mo.

[21] Appl. No.: 315,439

[22] Filed: Oct. 27, 1981

[51] Int. Cl.$^3$ ............ C08F 8/00; C08G 8/32; C08G 12/40
[52] U.S. Cl. ............ 525/418; 525/180; 525/183; 525/397; 525/508; 525/519; 525/530; 528/266; 564/153; 564/160
[58] Field of Search ............ 525/418, 183, 180, 397, 525/508, 519, 530; 528/266; 564/153, 160

[56] References Cited

U.S. PATENT DOCUMENTS

| | | | |
|---|---|---|---|
| 2,096,181 | 10/1937 | Jahrstorfer et al. | 564/153 |
| 2,364,737 | 12/1944 | McGrew | 564/160 |
| 2,430,875 | 11/1947 | Hallowell et al. | 528/266 |
| 2,430,908 | 11/1947 | Cairns | 528/266 |
| 3,048,620 | 8/1962 | Spivack | 564/160 |
| 3,300,439 | 1/1967 | Chloupek et al. | 528/266 |
| 3,410,649 | 11/1968 | Sellet | 528/266 |
| 3,712,926 | 1/1973 | Petersen | 564/160 |

FOREIGN PATENT DOCUMENTS

| | | | |
|---|---|---|---|
| 53-289 | 5/1978 | Japan | 528/266 |
| 495402 | 11/1938 | United Kingdom | 528/266 |

*Primary Examiner*—Ronald W. Griffin
*Attorney, Agent, or Firm*—Cushman, Darby & Cushman

[57] ABSTRACT

Cross-linking agents are produced by reacting an ester of a di- or poly-carboxylic acid with a molar excess of ammonium hydroxide, thereby forming a di- or polyamide, which in turn is then methylolated and etherified with a lower alkanol. These products are cross-linkers for resins such as alkyds, oil-free polyesters, acrylic which can be either acid or hydroxy functional, phenolics, epoxies or melamines.

10 Claims, No Drawings

ETHERIFIED METHYLOL POLYAMIDE CROSSLINKING AGENT, PROCESS FOR PRODUCING THE SAME AND RESINS CROSSLINKED THEREWITH

BACKGROUND OF THE INVENTION

The present invention relates to a novel crosslinking agent and to high solids resin systems produced therewith.

Known baking thermoset resin systems are generally cured with urea formaldehyde or melamine formaldehyde resins which contain 60 to 90% solids. However, such high solids curing agents, dictated by environmental considerations and regulations, are not only difficult to produce in conventional production equipment but the resultant resin crosslinked therewith is often brittle, thus seriously limiting its acceptability and use.

In such conventional urea and melamine systems, it has been found that an excess of methylol groups are often required because most of these crosslinking agents have a strong tendency to self-condense rather than react with the resin to be crosslinked.

SUMMARY OF THE INVENTION

It has now been found that resin systems having a high solids content and desirable viscosity characteristics can be produced with conventional production equipment using the novel crosslinking agent of the present invention.

Further, the flexibility of the coating or films resulting from being crosslinked with the crosslinking agent of this invention can be controlled or varied simply by the selection of certain reactants employed to produce these novel crosslinking agents. Simultaneously, the resultant coating or film exhibits desirable solvent resistance and toughness characteristics.

The novel crosslinking agent of the present invention is an etherified methylol polyamide.

More particularly, it is the product produced by reacting an ester of a di- or poly-carboxylic acid with a molar excess of ammonium hydroxide, thereby forming a di- or poly-amide, which in turn is then methylolated and etherified with a lower alkanol.

DETAILED DESCRIPTION OF THE INVENTION

The ester of the di- or poly-carboxylic acid employed in the production of the di- or poly-amide can be an alkyl ester, preferably, a lower alkyl ester wherein the alkyl moiety has 1-4 carbon atoms, of an aliphatic or aromatic di- or poly-carboxylic acid. The selection of the acid can influence to a great extent the degree of flexibility of the resulting crosslinked resin. The aliphatic dicarboxylic and polycarboxylic acids can contain 2-28 carbon atoms between carboxyl group and include such acids as succinic acid, glutaric acid, adipic acid, dimer fatty acids and trimer fatty acids as well as mixtures thereof. Representative aromatic acids include trimellitic acid, terephthalic acid and the like.

The ester of the di- or poly-carboxylic acid is reacted with a molar excess of ammonium hydroxide at temperatures ranging generally from about ambient to 70° C. to form a di- or polyamide. This is then methylolated at elevated temperatures from 85° to 120° C. with a methylolating agent such as paraformaldehyde. The resulting methylolated amide is then etherified using as an alkylation agent a lower alkanol containing up to 10 or more carbon atoms and preferably a primary alkanol such as methyl, propyl, butyl, or isobutyl alcohols and the like. Secondary and tertiary alkanols can also be employed.

Suitable coating compositions, in accordance with the present invention are derived from crosslinkable resins such as alkyds, oil-free polyesters, acrylics which can be either acid or hydroxy functional, phenolics, epoxies or melamines, crosslinked with a crosslinking agent derived from 20 to 33 equivalent percent of an acidic component comprising an ester of a di- or poly-carboxylic acid, 25 to 40 equivalent percent of paraformaldehyde and 33 to 50 equivalent percent of an alkanol.

Equivalent percent is calculated as follows:

$$\frac{\text{Number of moles of component} \times \text{Functionality of Component}}{\text{The sum of (the number of moles of component} \times \text{the functionality of the component)}}$$

The functionality of the amide formaldehyde resins of this invention is generally the same as the number of amide groups. For example, adipamide adds two methylol groups with ease, but further addition of formaldehyde becomes difficult. Thus, resins derived from adipamide react with a functionality of two.

The coating compositions of the present invention are crosslinked to a degree sufficient to impart solvent resistance characteristics to the resulting coating as well as other favorable or desirable properties.

In conventional urea and melamine systems, generally an excess of methylol groups are required in order to achieve adequate reaction with the resin being crosslinked. This occurs because conventional ureas and melamines exhibit a strong tendency to react with themselves rather than the resin to be crosslinked. One exception to this problem appears to be hexamethylated hexamethylol melamines which seem to react with a functionality of 3-3.5 and do not exhibit much tendency to react with themselves. The crosslinking agent of the present invention has a functionality of two which is quite adequate for crosslinking purposes and the resulting crosslinked resins exhibit improved flexibility and toughness as well as excellent solvent resistance.

The amide crosslinking agents of the present invention are also useful as a coating material when they self-condense in the absence of other reactive functional groups. The resulting coating exhibits desirable flexibility characteristics and it is believed that the self-condensed resin is linear in structure.

As indicated above, the extent or degree of flexibility of the coating crosslinked with the crosslinking agent of this invention can be controlled or varied by altering the structure of the bridge between the amide groups. Thus, using a diamide derived from terephthalic acid gives a structure having an aromatic ring between the amide groups and thus provides a coating less flexible than one produced from, for instance, adipic acid. Resins or coatings produced from adipamide have a four carbon chain between the amide groups and forms a fairly flexible structure. An even more flexible structure can be achieved using the diamides of dimer fatty acids since the bridge between the amide groups in this instance can contain up to about 28 carbon atoms.

The crosslinking agent of the present invention is useful in the preparation of coating compositions from alkyd resins, oil-free polyesters, acrylic resins, phenolic resins, epoxy resins and melamines. The crosslinking agent is present in varying amounts which can range from about 5 to 75 percent by weight of the total weight of the reactants employed in the composition. Preferably the crosslinking agent is employed in an amount 15 to 30 weight percent.

Representative conventional alkyd resins usefully crosslinked with the novel crosslinking agent of this invention include those made from such polybasic acids as phthalic anhydride, isophthalic acid, maleic anhydride, fumaric acid, azelaic acid, succinic acid, adipic acid, and sebacic acid. Useful oils employed to produce these alkyd resins include linseed, soya, dehydrated castor, tung, fish, safflower, oiticica, cottonseed and coconut oils. Representative polyhydric alcohols employed in the production of the crosslinked alkyd resin include, for instance, glycerol, pentaerythritol dipentaerythritol, trimethylol ethane, sorbitol, trimethylolpropane, ethylene glycol, propylene glycol, neopentyl glycol and dipropylene glycol. The alkyd resins are produced in accordance with conventional procedures.

Suitable oil-free polyesters usefully crosslinked with the crosslinking agent of this invention include those conventially made from equimolar amounts of polybasic acids and polyhydric alcohols including those noted above.

Representative epoxy resins usefully employed to produce crosslinked coatings or films in accordance with the present invention include those prepared by reacting epichlorohydrin with a phenolic compound such as bisphenol A, 4,4-isopropylidene bis(2,6-dibromophenol), resorcinol, phenol-formaldehyde novolac, orthocresol-formaldehyde novolac, p-aminophenol, 1,1,2,2-tetra(p-hydroxyphenyl)ethane and 1,1,3-tris(p-hydroxyphenyl) propane. These epoxy resins can be prepared in accordance with known and conventional procedures.

The acrylic resin usefully crosslinked with the novel crosslinking agent of this invention can be prepared by polymerizing two or more ethylenically unsaturated monomers one of which includes an —OH or —COOH group and at least one of which is free from such groups. Typically the monomer containing the —OH or —COOH group is acrylic acid, methacrylic acid, hydroxyethyl acrylate, hydroxypropyl acrylate, hydroxyethyl methacrylate or hydroxypropyl methacrylate.

The ethylenically unsaturated monomers which are free from —OH and —COOH groups can be, for example, the alkyl esters of acrylic or methacrylic acid, particularly those having from 1 to 4 carbon atoms in the alkyl moiety, e.g. methyl, ethyl, propyl or butyl acrylate; methyl, ethyl, propyl or butyl methacrylate; styrene, vinyl toluene and vinyl acetate.

These acrylic resins are known as are methods for producing the same.

Conventional phenolic resins made in accordance with procedures known to the art can also be employed with the novel crosslinking agent of the present invention. Representative phenol reactants employed with formaldehyde include, for instance, o-methylphenol, p-methylphenol, 2,4-dimethylphenol, 2,6-dimethylphenol, 2,4,6-trimethylphenol, 4-methyl-o-cresol, 3-methyl-2,2'-dihydroxydiphenylmethane and 3-methyl-4,4'-dihydroxydiphenylmethane.

Also usefully employed with the crosslinking agent of the present invention are melamine resins conventionally produced from melamine and formaldehyde.

The following examples are provided to illustrate the invention. All parts and percentages are by weight unless otherwise specified.

EXAMPLE 1

Preparation of Diamide From Methyl Esters

A 90/10 mixture of dimethyl adipate/dimethyl glutarate (1,000 g.—6.25 moles) and concentrated ammonium hydroxide (500 g.—8.65 moles) were charged into a two-liter flask fitted with a stirrer and thermometer. The mixture was agitated at room temperature for 8 hours. The solid amides which had crystallized were filtered and dried giving 772 g. (5.94 moles—95% yield).

Essentially the same procedures are employed to produce dimer fatty amide, glutaramide and adipamide.

The following crosslinking agents of the present invention were produced.

EXAMPLE 2

Dimer fatty amide (396.9 g., 0.724 moles), paraformaldehyde, 91%, (58.1 g., 1.76 moles), isobutyl alcohol (210 g., 2.84 moles) and phthalic anhydride (0.7 g.) were charged into a one-liter, three-neck flask fitted with a stirrer, thermometer, reflux condenser and suitable heating means. The mixture was heated to reflux and held for 30 minutes. Toluene (34 g.) was added and a water trap was put into the system. Water was then removed by azeotropic distillation and the solvent was removed by vacuum distillation. The resulting resin was a dark amber syrup with a 98.1% solids content at a Gardner viscosity of Z6+ with a 7.1 acid number.

EXAMPLE 3

Paraformaldehyde, 91%, (197.1 g., 5.98 moles), secondary butyl alcohol (442.8 g., 5.98 moles) and cobalt nitrate (0.9 g.) were charged into a one-liter, three-neck flask fitted with a stirrer, thermometer, reflux condenser and suitable heating means. The mixture was heated to reflux and held until clear. A 90/10 mixture of adipamide/glutaramide (215.1 g., 1.5 moles) was added and the mixture was again held at reflux until clear. Hexane (44 g.) was added and a water trap was put into the system. Water was then removed by azeotropic distillation. The resulting resin had a 49.1% solids content with a Gardner viscosity of A— and an 8.1 acid number.

EXAMPLE 4

Paraformaldehyde, 91%, (197.1 g., 5.98 moles), isobutyl alcohol (442.8 g., 5.98 moles) and cobalt nitrate (0.9 g.) were charged into a one-liter, three-neck flask fitted with a stirrer, thermometer, reflux condenser and suitable means of heating. The mixture was heated to reflux and held until clear. A 90/10 mixture of adipamide/glutaramide (215.1 g., 1.5 moles) was added and the mixture was again held at reflux until clear. Toluene (44 g.) was added and a water trap was put into the system. Water was then removed by azeotropic distillation. The resulting resin had a solids content of 58.7% with a Gardner viscosity of A— and a 2.6 acid number.

EXAMPLE 5

Paraformaldehyde, 91%, (197.1 g., 5.98 moles), n-butyl alcohol (442.8 g., 5.98 moles), and cobalt nitrate (0.9 g.) were charged into a one-liter, three-neck flask fitted with a stirrer, thermometer, reflux condenser and suitable heating means. The mixture was heated to reflux and held until clear. A 90/10 mixture of adipamide/glutaramide (215 g., 1.5 moles) was added and the mixture was held again at reflux until clear. Xylene (44 g.) was added and a water trap was put into the system. Water was then removed by azeotropic distillation. On cooling the resin solidified to a white, waxy material.

EXAMPLE 6

Glutaramide (184.8 g., 1.42 moles), paraformaldehyde, 91%, (93.8 g., 2.85 moles), isobutyl alcohol (420.7 g., 5.69 moles) and phthalic anhydride (0.7 g.) were charged into a one-liter, three neck flask fitted with a stirrer, thermometer, reflux condenser and suitable means of heating. The mixture was heated to reflux and held for 30 minutes. A water trap was put into the system and water was removed by azeotropic distillation. The resulting resin had a solids content of 49.5% with a Gardner viscosity of A— and a 54.9 acid number.

EXAMPLE 7

Glutaramide (184.8 g., 1.42 moles), paraformaldehyde, 91%, (93.8 g., 2.85 moles), secondary butyl alcohol (421.3 g., 5.69 moles), and cobalt nitrate (0.07 g.) were charged into a one-liter, three-neck flask fitted with a stirrer, thermometer, reflux condenser and suitable means of heating. The mixture was heated to reflux and held for one hour. Hexane (50 g.) was added and a water trap was put into the system. Water was removed by azeotropic distillation followed by vacuum distillation of solvent (190 ml.). The resulting resin had a solids content of 80.4% with a Gardner viscosity of Z— and a 41 acid number.

EXAMPLE 8

A 32/68 mixture of adipamide/glutaramide (544 g., 4.03 moles), paraformaldehyde, 91%, (266 g., 8.07 moles), secondary butyl alcohol (1189.2 g., 16.07 moles) and cobalt nitrate (0.8 g.) were charged into a three-liter, three-neck flask fitted with a stirrer, thermometer, reflux condenser and suitable heating means. The mixture was heated to reflux and held for one hour. Hexane (100 g.) was added and a water trap was put into the system. Water was removed by azeotropic distillation followed by vacuum distillation of solvent (500 ml.). The resulting resin had a solids content of 69.2 with a Gardner viscosity of U-V and a 16.0 acid number.

EXAMPLE 9

A 32/68 mixture of adipamide/glutaramide (540 g., 4 moles), paraformaldehyde, 91%, (316 g., 9.6 moles), isobutyl alcohol (1142 g., 15 moles) and phthalic anhydride (2 g.) were charged into a three-liter, three-neck flask fitted with a stirrer, thermometer, reflux condenser and suitable heating means. The mixture was heated to reflux and held for one hour. Toluene (100 g.) was added and a water trap was put into the system. Water was removed by azeotropic distillation followed by vacuum distillation of solvent (350 ml.). The resulting resin had a solids content of 75.8% with a Gardner viscosity of O+ and a 12.4 acid number.

EXAMPLE 10

A 32/68 mixture of adipamide/glutaramide (409.7 g.), Butyl Formcel (751.4 g.), n-butyl alcohol (453.9 g.), xylene (83.3 g.) and phthalic anhydride (1.7 g.) were charged into a three-liter, three-neck flask fitted with a stirrer, thermometer, water trap, reflux condenser and suitable heating means. The mixture was heated to reflux and water was removed by azeotropic distillation. The solvent was then removed under vacuum giving a white, waxy solid with an acid number of 27.2.

EXAMPLES 11–16

Following are film test comparisons using these various crosslinking agents in combination with various resins which are then baked and air dried with catalyst.

The resin materials for crosslinking with the crosslinking agent of this invention consisted of two conventional alkyd resins. A butylated urea formaldehyde resin was used for comparison purposes.

|  | Coconut Alkyd #1 | Soya Alkyd #2 | Urea Resin |
|---|---|---|---|
| % Oil | 32 | 42 | — |
| Non Volatiles | 60 | 60 | 50 |
| Visc. | Z1-Z3 | X-Y | W-Y |
| Naphtha tolerance | — | — | 11–18 |

The following compositions were prepared, the amounts indicated representing parts by weight:

| Example No. | Alkyd #1 | Alkyd #2 | Urea Resin | Crosslinking Agent - Ex. 9 |
|---|---|---|---|---|
| 11 | 70 | — | 30 | — |
| 12 | 70 | — | — | 30 |
| 13 | — | 70 | 30 | — |
| 14 | — | 70 | — | 30 |
| 15 | 60 | — | 40 | — |
| 16 | 6 | — | — | 40 |

All these materials were baked for 30 minutes at 115° F. and were also air dried with 1% p-toluene sulfonic acid under essentially identical conditions. The films were evaluated for sward hardness and solvent resistance (double rubs with methyl ethyl ketone saturated rag) with results as follows:

| | Bake 30 min. @ 115° F. | | | |
|---|---|---|---|---|
| Example No. | Sward Hardness | 1 Week Sward Hardness | MEK Rubs Immediate | MEK Rubs 1 Week |
| 11 | 20 | 36 | 26 | 100+ |
| 12 | 4 | 15 | 6 | 86 |
| 13 | 28 | 56 | 23 | 100+ |
| 14 | 4 | 16 | 5 | 32 |
| 15 | 31 | 46 | 23 | 100+ |
| 16 | 3 | 16 | 5 | 33 |

| | Air Dry Results | | | |
|---|---|---|---|---|
| Example No. | Sward Hardness | 1 Week Sward Hardness | MEK Rubs 1 Day | MEK Rubs 1 Week |
| 11 | 30 | 34 | 49 | 100+ |
| 12 | 4 | 15 | 6 | 105 |
| 13 | 31 | 40 | 80 | 100+ |
| 14 | Tacky | 5 | 3 | 11 |
| 15 | 30 | 48 | 100+ | 100+ |
| 16 | Tacky | 9 | 0 | 100+ |

It can be seen that the use of the crosslinking agents of this invention results in films which cure well, but do not become hard and brittle.

EXAMPLE 17

In another experiment the crosslinking agent of Example 9 was mixed in an equimolar ratio with bis phenol A along with 2% on solids of polyvinyl butyral and catalyzed with 1% p-toluene sulfonic acid. When coated and baked 10 minutes at 400° F. the material formed a smooth hard film with good flexibility characteristics not generally found in phenolics. Other crosslinking agents of this invention have also been prereacted with more volatile phenols with similar results.

What is claimed is:

1. A cross-linking agent comprising a reaction product produced by (1) reacting a diester of a di- or poly-carboxylic acid with a molar excess of ammonium hydroxide to form a di- or polyamide, (2) methylolating said di- or polyamide and (3) etherifying the resulting methylolated di- or polyamide with an alkanol.

2. A process for producing an etherified methylol polyamide comprising
    (1) reacting an ester of di- or poly-carboxylic acid with a molar excess of ammonium hydroxide at a temperature ranging from ambient to 70° C. to produce a corresponding di- or polyamide of said di- or poly-carboxylic acid, and
    (2) reacting the said di- or polyamide with a methylolating agent and a methylol alkylating agent at an elevated temperature to produce said etherified methylol polyamide.

3. The process of claim 2 wherein said ester of a di- or poly-carboxylic acid is a lower alkyl ester.

4. The process of claim 3 wherein said ester is a methyl ester.

5. The process of claim 2 wherein said dicarboxylic acid has the formula $HOOC-(CH_2)_n-COOH$ wherein n is equal to 2 to about 28.

6. The process of claim 5 wherein said dicarboxylic acid is succinic acid, glutaric acid, adipic acid, a dimer fatty acid or a mixture thereof.

7. The process of claim 2 wherein said polycarboxylic acid is trimellitic acid or trimer fatty acid.

8. A process for producing an etherified methylol polyamide comprising reacting a di- or polyamide with a methylolating agent and a methylol alkylating agent at an elevated temperature.

9. A resin crosslinked with the crosslinking agent of claim 1.

10. The resin of claim 9 selected from an alkyd, a polyester, an acrylic, a phenolic, an epoxy, a melamine or a urea resin.

* * * * *